Oct. 7, 1924.　　　　　　　　　　　　　　　　　　　　1,510,683
J. KLEPACH
GRAVEL CLEANER
Filed Dec. 7, 1922
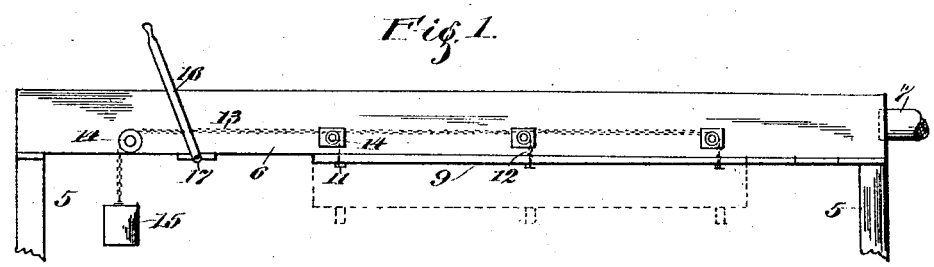
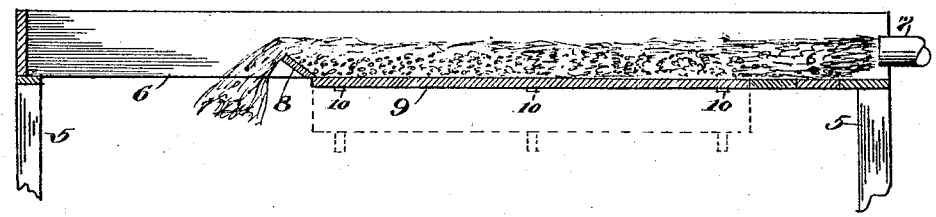
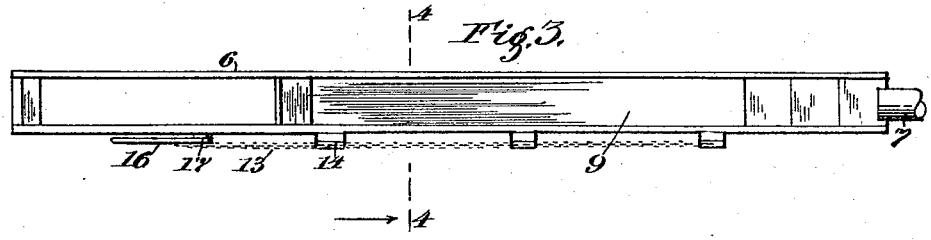
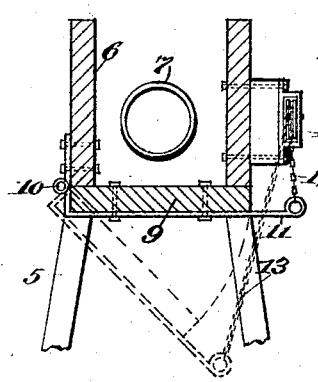
Inventor
John Klepach
By J. M. St. John
Atty.

Patented Oct. 7, 1924.

1,510,683

UNITED STATES PATENT OFFICE.

JOHN KLEPACH, OF CEDAR RAPIDS, IOWA.

GRAVEL CLEANER.

Application filed December 7, 1922. Serial No. 605,498.

*To all whom it may concern:*

Be it known that I, JOHN KLEPACH, a citizen of the United States, residing at Cedar Rapids, in the county of Linn and State of Iowa, have invented certain new and useful Improvements in Gravel Cleaners; and I do hereby declare the following to be a full, clear, and exact description of the invention, such as will enable others skilled in the art to which it appertains to make and use the same.

This invention relates to the preparation of sand and gravel, more particularly the latter, for use in making concrete and the like.

The object of the invention is to produce a simple, automatic apparatus whereby the refuse matter commonly found in river beds, such as mud, leaves, waterlogged sticks, and other stuff, may be separated from the gravel, thereby leaving it in perfect condition for structural use.

The invention embodies certain improvements in apparatus for the same purpose as set forth in a companion application for Patent, No. 605,499, filed December 7, 1922. In said application there is shown an intermittently rotating sluice-box to receive and dump the gravel, whereas in this application a sluice-box with a hinged bottom is employed the bottom being supported by a weight until a predetermined amount of gravel has accumulated.

The invention is fully shown and described in the description and claims following, reference being had to the accompanying drawing, in which:—

Fig. 1 is a side elevation of apparatus embodying my invention. Fig. 2 is a central, longitudinal section of the same. Fig. 3 is a plan view of the same. Fig. 4 is an enlarged cross-section of the same on the line 4—4 of Fig. 3, looking to the right.

On suitable supports 5 is mounted a long, trough-like box (the sluice-box) 6. At the right, upper end, as regards the flow of material, a pipe 7 enters the box, and is supposed to communicate with a sand-pump (not shown) whereby the commingled water, gravel and refuse is delivered to the sluice-box, usually from a river bed. The flow of material through the sluice-box is partially arrested by an inclined baffle-board 8, which serves to catch the heavy gravel from being carried forward by the current, but allows the water, refuse, and other lighter materials to run over, as indicated in Fig. 2. Back of this baffle-board a bottom-board 9 is hinged to the sluice box at 10. The board is provided with projecting arms 11, and these connect by short chains 12 with a long chain 13 carried by sheaves 14. To the free end of the chain is attached a heavy weight 15, whereby the bottom-board is supported until the weight of the accumulated gravel exceeds it, when the load dumps automatically, as shown in Fig. 4 by the dotted outline.

The dumping of the load of gravel is not always complete and clean, and provision is accordingly made for shaking off any part of it that may be sticking to the bottom-board. This consists of a lever 16 pivoted at 17, and connecting with the main chain. By reciprocating the lever the board is jarred and shaken, and any adhering gravel is thus dislodged.

It will be evident that the gravel is deposited in a pile beneath the bottom-board, and the refuse material, which does not settle like the gravel, is carried forward and beyond the pile of gravel, which in its cleansed condition may be conveniently shoveled up and loaded for use.

I claim:

1. In gravel cleaning apparatus, the combination with means for delivering material commingled with water, of a long receiving sluice-box, a laterally hinged bottom-board therefor, a suspending chain therefor, and a weight attached to its free end.

2. In gravel cleaning apparatus, the combination with means for delivering the watery material thereto, of a long sluice-box, an arresting baffle-board therein, a bottom-board laterally hinged to the box behind the baffle-board, a supporting chain for said board, and a weight attached to the free end of the chain, and adapted to support a load of gravel settling on said board.

3. In gravel-cleaning apparatus, the combination with means for delivering the watery material thereto, of a long sluice-box, a laterally hinged bottom therefor, a chain attached to the board, a weight attached to the free end of the chain, and chain-supporting sheaves.

4. In gravel-cleaning apparatus, the combination with means for delivering watery material thereto, of a long sluice-box, a laterally hinged bottom therefor, a supporting chain, sheaves to carry said chain, a weight attached to the free end of the chain, and a shaking lever connecting with the chain between the bottom-board and the weight.

In testimony whereof I affix my signature in presence of two witnesses.

JOHN KLEPACH.

Witnesses:
H. WALTER TAYLOR,
ERNEST MELBERG.